United States Patent [19]

Dutta

[11] Patent Number: 5,378,495
[45] Date of Patent: Jan. 3, 1995

[54] METHOD OF COATING A FLUORESCENT LAMP

[75] Inventor: Arunava Dutta, Winchester, Mass.

[73] Assignee: Osram Sylvania Inc., Danvers, Mass.

[21] Appl. No.: 189,853

[22] Filed: Feb. 1, 1994

[51] Int. Cl.⁶ .......................... B05D 5/06; B05D 5/12
[52] U.S. Cl. ...................................... 427/67; 427/157
[58] Field of Search ................ 427/67, 214, 157, 218

[56] References Cited

U.S. PATENT DOCUMENTS

| | | |
|---|---|---|
| 2,987,414 | 6/1961 | Martyny . |
| 3,006,781 | 10/1961 | Martyny . |
| 3,351,194 | 11/1967 | Butler et al. ........................ 427/67 |
| 3,607,371 | 9/1971 | Haynes et al. ...................... 427/157 |
| 3,912,828 | 10/1975 | Olwert ................................ 427/230 |
| 3,999,993 | 12/1976 | Patel .................................. 427/157 |
| 4,297,390 | 10/1981 | Franz et al. ......................... 427/157 |
| 5,126,166 | 6/1992 | Dutta et al. .......................... 427/67 |
| 5,151,215 | 9/1992 | Sigai .................................... 427/67 |
| 5,213,894 | 5/1993 | Kim ..................................... 427/68 |
| 5,234,710 | 8/1993 | Dutta .................................... 427/67 |

Primary Examiner—Shrive Beck
Assistant Examiner—Diana Dudash
Attorney, Agent, or Firm—Robert F. Clark

[57] ABSTRACT

A method for coating a fluorescent lamp with an aqueous suspension of a multi-component phosphor blend wherein the isoelectric point(IEP) of at least one of the individual phosphors is separated by at least two pH units from the effective IEP of the other phosphors. The method involving altering the IEP of the first phosphor to within about two pH units of the effective IEP of the other phosphors, adding the modified phosphor to an aqueous suspension of the other phosphors, the aqueous suspension having a pH outside the range defined by the modified IEP and the effective IEP to inhibit flocculation, and coating a fluorescent lamp.

10 Claims, No Drawings

METHOD OF COATING A FLUORESCENT LAMP

TECHNICAL FIELD

This invention generally relates to methods for coating the interior surfaces of fluorescent lamps with phosphors. More particularly, it relates to the use of aqueous coating suspensions of phosphors to coat fluorescent lamps.

BACKGROUND OF THE INVENTION

Phosphor coatings on the interior surfaces of fluorescent lamps are achieved by contacting the glass surface of the lamp envelope with a suspension of the phosphors in such a manner as to yield a consistent, uniform coating of the entire surface. The excess suspension is drained away under force of gravity and the wet coating is dried by passing hot air through the lamp. The dried coating is then baked at an elevated temperature in air to decompose the organic binder to obtain the finished coating. The texture of the phosphor coating in the finished lamp is very sensitive to the degree of dispersion of the phosphors in the coating suspension. Flocculation of the phosphor particles leads to an unacceptable lamp texture. Thus, the coating suspension has to be adjusted to prevent this undesirable phenomenon.

In aqueous suspensions of phosphors, the stability of the suspension depends on a balance between electrostatic repulsive forces and van der Waals attractive forces. Flocculation may occur between particles of the same phosphor (intra-particle), or, as in the case of phosphor blends, it may occur between particles of dissimilar phosphors (inter-particle). Phosphor particles in an aqueous suspension develop a surface charge which is dependent upon the pH of the suspension and the Isoelectric Point (IEP) of the phosphor. The IEP is defined as the pH at which zeta potential is zero. If the pH of the suspension is above the IEP of a phosphor, then the phosphor particles are negatively charged, if the pH is lower than the IEP, then the phosphor particles are positively charged.

In an aqueous suspension of a multi-component phosphor blend, the phosphors can have widely different IEP's. In such a situation, flocculation will occur unless the pH of the solution is such that all of the phosphor particles have surface charges which have the same polarity and which are of sufficient magnitude to overcome the van der Waals attractions. In other words, stability is achieved by ensuring that there is a net electrostatic repulsive force between the phosphor particles in the suspension.

In U.S. Pat. No. 5,234,710 to Dutta et al., flocculation is inhibited in an aqueous coating suspension for a suntanning lamp by adjusting the pH of the aqueous suspension to a value which is outside of the pH range defined by the IEP's of the individual phosphors in the two-component blend. However, this approach is not applicable to all types of phosphor systems. In particular, multi-component phosphor blends which contain phosphors of widely varying IEP's can require adjusting the pH of the suspension either to very low pH, highly acidic conditions or very high pH, highly basic conditions. Such pH extremes can cause the dissolution of phosphors in the suspension and pose environmental and safety problems for the manufacturer. Thus, it would be advantageous to provide a method which inhibited flocculation in these systems without having to use suspensions having pH values lower than 7 or greater than 11. Preferably, the aqueous suspension would have a manageable pH of between 7 and 10.

SUMMARY OF THE INVENTION

It is an object of the invention to obviate the disadvantages of the prior art. In accordance with one aspect of the invention, there is provided a method for forming a deflocculated aqueous suspension of a multi-component phosphor blend in a more manageable pH range.

In accordance with another aspect of the invention, there is provided a method of coating a fluorescent lamp with a coating comprising a first phosphor having a first isoelectric point at a first pH value and a second phosphor having a second isoelectric point at a second pH value, said second pH value being separated from said first pH value by at least two pH units, comprising the steps of forming a first aqueous suspension of said first phosphor, altering said first isoelectric point of said first phosphor to obtain a modified isoelectric point at a modified pH value, said modified pH value being within about two pH units of said second pH value, said modified pH value and said second pH value defining a pH range, filtering said first phosphor from said first aqueous suspension, adding said first phosphor to a second aqueous suspension containing said second phosphor, said second aqueous suspension having a pH value outside of said pH range to inhibit flocculation, coating said fluorescent lamp with said second aqueous suspension to form a coated fluorescent lamp.

In accordance with another aspect of the invention, the IEP of a phosphor in an aqueous suspension of a multi-component phosphor blend is modified by coating the surface of the phosphor particles with fine particles of aluminum or magnesium oxide to obtain a more desirable IEP.

For a better understanding of the present invention, together with other and further objects, advantages and capabilities thereof, reference is made to the following disclosure and appended claims.

DETAILED DESCRIPTION

By controlling the combination of pH and the IEP's of the individual phosphors, one can inhibit the flocculation of (or deflocculate) an aqueous coating suspension containing a multicomponent blend. A comprehensive discussion of the interrelationship of IEP's and pH is provided in U.S. Pat. No. 5,234,710 to Dutta et al. the specification of which is specifically incorporated herein. The electrokinetic properties of an aqueous suspension can be measured with an electroacoustic based apparatus such as the Matec ESA-8000 which is manufactured by Matec Instruments. This instrument excites an aqueous suspension of particles with a high frequency electric field. The interaction between the charged particles and the alternating electric field causes the particles to oscillate in the water thereby producing a sound wave whose amplitude is measured by the instrument. The amplitude of the sound wave, also called the Electrokinetic Sonic Amplitude (ESA) is directly proportional to the zeta potential of the particles in the suspension. Thus, the ESA is zero when the zeta potential is zero. The IEP of the suspension can then be determined by measuring changes in the ESA with varying pH because the IEP is the pH at which the ESA (and zeta potential) is zero. The ESA and pH of the phosphor suspensions described herein were measured with the Matec ESA-8000 system which simultaneously measures the ESA, pH and conductivity of the dispersion at a controlled temperature. The IEP's were determined by performing potentiometric titrations on the phosphor suspensions while monitoring the ESA.

Some of the most difficult phosphor blends to form deflocculated suspensions of involve combinations of the acidic calcium halophosphate phosphors and the basic rare earth activated phosphors. In particular, a tri-component blend containing a typical cool white halophosphate phosphor, a redemitting europium-activated yttrium oxide and green-emitting cerium, terbium-activated magnesium aluminate would be difficult to deflocculate because of the widely different IEP's of the three phosphors. For example, SYLVANIA type 4450 Cool White (CW) halophosphate phosphor [$Ca_5(F,Cl)(PO_4)_3$:Sb,Mn] has an acidic IEP of about 2.3, whereas, the rare earth activated phosphors, SYLVANIA type 243x europium-activated yttrium oxide [$Y_2O_3$:Eu] and SYLVANIA type 229x cerium and terbium-activated magnesium aluminate [(Ce,Tb)$MgAl_{11}O_{19}$:Ce:Tb] have basic IEP's of about 8.5–8.9 and 9.3–9.75, respectively.

A suspension of these phosphors was prepared by adding 7.5 grams of the CW halophosphate phosphor and 3.75 grams of each of the two rare earth activated phosphors to 200 ml of distilled water to yield a suspension containing about 2 % by volume of solids. The amounts of the phosphors combined to make the suspension were selected such that the total surface area of the CW halophosphate phosphor was approximately the same as the sum of the total surface areas of the two rare earth phosphors. The effective IEP of this blend in an aqueous suspension is about 7.65. In order to prevent flocculation, a pH below 6 or above 9, is required. However, the lower pH range is not acceptable because it causes the dissolution of the yttrium oxide phosphor. And, although a pH of greater than 9 can be attained by adding a base, such as ammonium hydroxide or an organic amine, to the suspension, the use of such hazardous materials can present environmental and safety hazards for the manufacturer. Furthermore, the high pH values can be difficult to maintain. Thus, it would be desirable to raise the IEP of the cool white halophosphate phosphor to about 8.5. A CW halophosphate phosphor having IEP of about 8.5 would be within about 1 pH unit of the IEP's of the two rare earth phosphors and should increase the effective IEP of the tri-component blend to about 8.75. Since the effective IEP of the tri-component blend is increased, it would be possible to use a pH of about 7 to prevent flocculation in this suspension. A pH of 7 is relatively easy to maintain by the addition of relatively weak and non-hazardous reagents to the suspension.

One method for increasing the IEP of the CW phosphor involves adding an amount of high surface area alumina to an aqueous suspension of the CW phosphor. Once the IEP of the CW phosphor has been modified, it can then be removed from the suspension by filtering and added to a second aqueous suspension of the rare earth phosphors. For example, Aluminum Oxide C (AOC) from Degussa which has a surface area of about 90 $m^2/g$ and a particle size of about 20 nm can be used to increase the IEP of the CW halophosphate phosphor. The surface area of the AOC is considerably greater than the surface area of the CW phosphor which is about 0.55 $m^2/g$. The IEP of the CW phosphor, as previously stated, is about 2.3, whereas the IEP of the AOC 9.15. A dispersion of 12.65 grams of CW phosphor in 200 ml of water was prepared. The dispersion was found to have a stable pH of about 6.4. AOC in amounts between 1.25% to 10% by weight of the CW phosphor were added to the dispersion. Because the pH of the suspension is between the IEP's of the CW phosphor and the AOC, the particles of the two different materials should have opposite surface charges. Based on electrokinetic principles, the AOC particles should become positively charged and the CW phosphor particles should become negatively charged. Thus, the AOC should be attracted to and cover a portion of the surface of the CW particles. And, in fact, the measured IEP's of these suspensions increased dramatically indicating that the AOC has coated a portion of the CW surface. The following table gives the IEP's for the various suspensions.

| Percent by weight AOC | Measured IEP |
| --- | --- |
| 0 (only CW) | 2.3 |
| 1.25 | 7.1 |
| 2.5 | 7.35 |
| 5 | 7.95 |
| 10 | 8.45 |

Thus, by adding AOC to a suspension of CW phosphor it is possible to raise the IEP of the CW phosphor to about 8.5.

Another way of raising the IEP of the CW phosphor is to add a fine particle size, high surface area magnesium oxide, MgO, powder to a dispersion of CW phosphor. Fine particle size MgO powders also have high IEP's. Again, the amount of the increase in the IEP of the CW phosphor would depend on the extent that the CW particles are covered by the MgO particles. This depends on the relative amounts of CW phosphor and MgO, the specific surface areas of the two powders, and the pH of the dispersion upon mixing of the two powders.

A commercially available, high purity MgO from J. T. Baker & Co. having a measured surface area of about 24.5 $m^2/g$ was used to raise the IEP of the CW halophosphate phosphor. The IEP of the MgO was measured by forming a dispersion of 379.5 mg of MgO in 200 ml of deionized water. Potentiometric titration of this dispersion with 0.1 N NaOH determined that the IEP was about 11.6. Next, a dispersion of containing the CW halophosphate phosphor and about 0.25 wt. % MgO was formed by combining 12.65 g CW halophosphate phosphor and 31.6 mg of MgO in 200 ml of deionized water. After aging the dispersion for at least 30 minutes, a potentiometric titration determined the IEP of the dispersion to be about 10.6 which is within about 2 pH units of the two rare earth phosphors. A second dispersion containing 1 wt. % MgO was measured to have an effective IEP of 11.25. Thus, it is clear that MgO is more effective in raising the IEP of the CW halophosphate phosphor than AOC because significantly smaller additions result in large changes in the effective IEP. Therefore, even smaller additions of MgO should result in raising the IEP of the CW halophosphate phosphor to about 8.5.

Other methods can also be used to alter the IEP's of phosphors before they are combined with other phosphors in aqueous suspensions. For example, it is possible to use wash treatments to change the IEP of different phosphors. The IEP of the green-emitting lanthanum phosphate (LAP) phosphor, $LaPO_4$:Ce,Tb, can be increased by washing the phosphor in a basic solution. A dispersion of 10.5 grams of a LAP phosphor in 200 ml of water was found to have an IEP of 6.6. The same phosphor after having undergone a wash with 1M potassium hydroxide was found to have an IEP of 8.85.

Additional methods for increasing the IEP of CW phosphor include coating the phosphor with an alumina coating such as the coating described in U.S. Pat. No. 4,825,124 issued to Sigai and adding cationic surfactants such as the low molecular weight, strongly cationic, Polymer 1190 manufactured by Betz.

Alternatively, it is also possible to lower the IEP's of phosphors by using anionic surfactants such as PVM/MA, a copolymer of vinyl methyl ether and maleic anhydride, and PA, polyacrylic acid.

While there have been shown and described what are at present considered to be the preferred embodiments of the invention, it will be apparent to those skilled in the art that various changes and modifications can be made herein without departing from the scope of the invention as defined by the appended claims.

I claim:

1. A method of coating a fluorescent lamp with a coating comprising a first phosphor having a first isoelectric point at a first pH value and a second phosphor having a second isoelectric point at a second pH value, said second pH value being separated from said first pH value by at least two pH units, comprising the steps of:
    forming a first aqueous suspension of said first phosphor;
    altering said first isoelectric point of said first phosphor to obtain a modified isoelectric point at a modified pH value, said modified pH value being within about two pH units of said second pH value, said modified pH value and said second pH value defining a pH range;
    filtering said first phosphor from said first aqueous suspension;
    adding said first phosphor to a second aqueous suspension containing said second phosphor, said second aqueous suspension having a pH value outside of said pH range to inhibit flocculation; and
    coating said fluorescent lamp with said second aqueous suspension to form a coated fluorescent lamp.

2. The method of claim 1 wherein said second phosphor is a phosphor blend and said second isoelectric point is an effective isoelectric point.

3. The method of claim 1 wherein said first phosphor is a halophosphate phosphor.

4. The method of claim 3 wherein said altering of said first isoelectric point of said first phosphor is accomplished by adding a quantity of magnesium oxide powder to said first aqueous suspension to coat the surface of said first phosphor.

5. The method of claim 3 wherein said altering of said first isoelectric point of said first phosphor is accomplished by adding a quantity of aluminum oxide powder to said first aqueous suspension to coat the surface of said first phosphor.

6. The method of claim 1 wherein said altering of said first isoelectric point of said first phosphor is accomplished by adding a cationic surfactant to said first aqueous suspension.

7. The method of claim 1 wherein said altering of said first isoelectric point of said first phosphor is accomplished by adding an anionic surfactant to said first aqueous suspension.

8. The method of claim 1 wherein said pH value of said second aqueous suspension is about 7.

9. The method of claim 4 wherein the magnesium oxide powder has a surface area of about 24.5 $m^2/g$.

10. The method of claim 5 wherein the aluminum oxide powder has a surface area of about 90 $m^2/g$.

* * * * *